United States Patent [19]

Taniguchi et al.

[11] Patent Number: 4,955,696

[45] Date of Patent: Sep. 11, 1990

[54] LIQUID CRYSTAL DRIVING SYSTEM

[75] Inventors: Koki Taniguchi, Osaka; Tamaki Mashiba, Nara, both of Japan

[73] Assignee: Sharp Kabushiki Kaisha, Osaka, Japan

[21] Appl. No.: 394,158

[22] Filed: Aug. 14, 1989

Related U.S. Application Data

[63] Continuation of Ser. No. 879,638, Jun. 27, 1986, abandoned.

[30] Foreign Application Priority Data

Jun. 28, 1985 [JP] Japan ............................... 60-143570

[51] Int. Cl.[5] .......................... G02F 1/13; G09G 1/14; G09G 3/00; G09G 3/36

[52] U.S. Cl. .................................... 350/332; 350/333; 340/749; 340/765; 340/784; 340/805

[58] Field of Search ................... 350/331 R, 332, 333; 340/749, 765, 784, 805

[56] References Cited

U.S. PATENT DOCUMENTS

| | | | |
|---|---|---|---|
| 3,961,840 | 6/1976 | Morokawa et al. | 350/332 |
| 4,048,633 | 9/1977 | Sano | 340/805 |
| 4,121,303 | 10/1978 | Edwards et al. | 340/336 |
| 4,196,432 | 4/1980 | Chihara | 350/332 |
| 4,354,188 | 10/1982 | Schneider | 340/749 |
| 4,645,303 | 2/1987 | Sekiya et al. | 350/332 |

FOREIGN PATENT DOCUMENTS 2103003 2/1983 United Kingdom .

*Primary Examiner*—Stanley D. Miller
*Assistant Examiner*—Trong Quang Phan

[57] ABSTRACT

A liquid crystal driving system using a dynamic driving method, which includes circuits for driving liquid crystals by applying AC-converted signals containing a specific frequency which is higher than the frame-frequency and different from the duty factor of the data signals.

11 Claims, 6 Drawing Sheets

LIQUID CRYSTAL DRIVING SYSTEM

This application is a continuation of application Ser. No. 06/879,638 filed on June 27, 1986, now abandoned.

BACKGROUND OF THE INVENTION

The present invention relates to a liquid crystal driving system using dynamic driving means.

Conventionally, it is known that liquid crystal characteristics deteriorate when a liquid crystal is driven by the constant application of a specific voltage in the same direction between two electrodes. In one technique used to prevent such deterioration, an AC-converted signal capable of varying the voltage polarity of the electrodes is applied to each frame in which one scanning cycle of the liquid crystal matrix is completed. However, this technique has the disadvantageous effect that, as the duty factor increases, an uneven contrast is generated between the identical ON and OFF picture elements, resulting in a significantly degraded display. In extreme cases, when comparing a segment line using the highest frequency and a segment line using the lowest frequency, a nearly equivalent contrast may undesirably be generated between the OFF picture elements of one segment line and the ON picture elements of the other segment line. For example, as shown in FIG. 10, the conventional 16×10 dot matrix liquid crystal display unit is provided with segment-side electrodes 1 through 16 and common-side electrodes A through J. The third column of the segment-side electrodes has a specific pattern and uses the highest frequency to switch alternate dots ON and OFF on every other line, whereas the fourth column of the segment-side electrodes uses the lowest frequency to switch all dots OFF. Line F of the sixth row of common-side electrodes has dots "a" and "b" which both remain OFF. Although both of these dots should be provided with identical OFF contrast, for the reasons described below, these dots differ in contrast and cause the display to become uneven, eventually degrading the overall display quality. FIG. 11 shows the waveforms of the drive signals used with a 16×10 dot matrix liquid crystal display unit, in which the driving method uses a duty of 1/10 and a bias of ⅓. The factors affecting the contrast and display quality are listed below.

(A) AC-converted signal M, whose polarity is inverted in each frame period TM.

(B) Common signal CF, which drives line F in the sixth row of the common-side electrodes.

(C) Segment signal S4, which drives the fourth column of the segment-side electrodes.

(D) Signal Vb (CF−S4), which is applied to dot "b".

(E) Segment signal S3, which drives the third column of the segment-side electrodes.

(F) Signal Va (CF−S3) which is applied to dot "a".

Ideally, the effective values of signals Va and Vb as well as the OFF-contrast of dots "a" and "b" should be identical. However, in actuality, the waveforms are subjected to distortion caused by the resistance of the electrodes, the capacitance of the liquid crystals themselves, and the driving capacity of the liquid crystal driving circuit. This waveform distortion eventually causes a difference between signals Va and Vb. In this example, since the waveforms of signal Vb are less affected by distortion than signal Va, signal Vb has a greater effective value than Va. As a result, dot "b" generates a higher OFF-contrast than does dot "a". The same is true of the ON-contrast effect. This phenomenon is even more noticeable when a higher duty is used.

SUMMARY OF THE INVENTION

In light of the disadvantages inherent in any conventional liquid crystal driving system such as those mentioned above, the present invention aims to provide a novel liquid crystal driving system which securely improves the display quality. The present invention, related to a liquid crystal driving system using a dynamic driving method, drives liquid crystals by the application of an AC-converted signal containing a specific frequency which is higher than the frame-frequency and different from the duty factor.

BRIEF DESCRIPTION OF THE DRAWINGS

The present invention will be better understood by viewing the detailed description given herein below and the accompanying drawings which are given by way of illustration only, and thus are not limitative of the present invention wherein.

DESCRIPTION OF THE PREFERRED EMBODIMENTS

Figure 10:
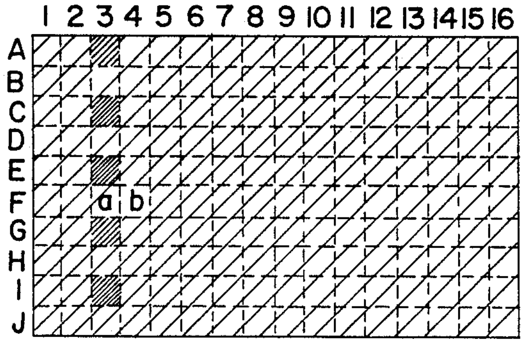
FIG. 10 is a chart representing a 16×10 dot matrix liquid crystal display device.

Referring now to the accompanying drawings, one of the preferred embodiments of the present invention is described below. FIG. 7 represents the waveforms of liquid crystal driving signals produced when driving the 16×10 dot matrix liquid crystal display device shown in FIG. 10 by applying an AC-converted signal M′ having a specific frequency higher than the AC-converted signal M which uses a frame frequency. In FIG. 7, (A) denotes the AC-converted signal M which alternates in each frame. (B) denotes a clock pulse CL of common electrodes. (C) denotes the AC-converted signal M′ generated from the AC-converted signal M and which alternates every time it receives two clock pulses CL. (D) denotes a common signal CF′ which drives the line F in the sixth row of the common electrode, said signal CF′ being is derived from the AC-converted signal M′. (E) denotes segment signal S4′ which drives the fourth row of the segment electrodes, said signal S4′ being is derived from the AC-converted signal M′. (F) denotes a the signal Vb′ (CF′ −S4′) applied to dot "b" and derived from the AC-converted signal M′. (G) denotes a segment signal S3′ which drives the third row of the segment electrodes, in which said signal S3′ is derived from the AC-converted signal M′. (H) denotes a signal Va′ (CF′−S3′) delivered to dot "a" which is derived from the AC-converted signal M′.

Figure 1:
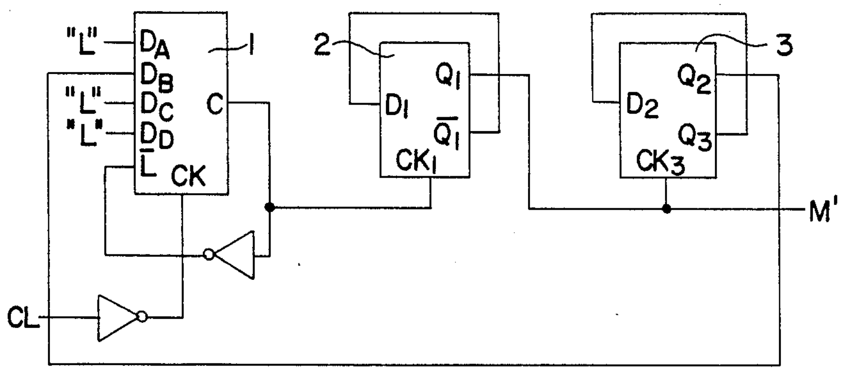
FIG. 1 through 5 and FIG. 8 are simplified block diagrams representing the AC-converted signal generator circuits reflecting the preferred embodiments of the present invention.
Figure 2:
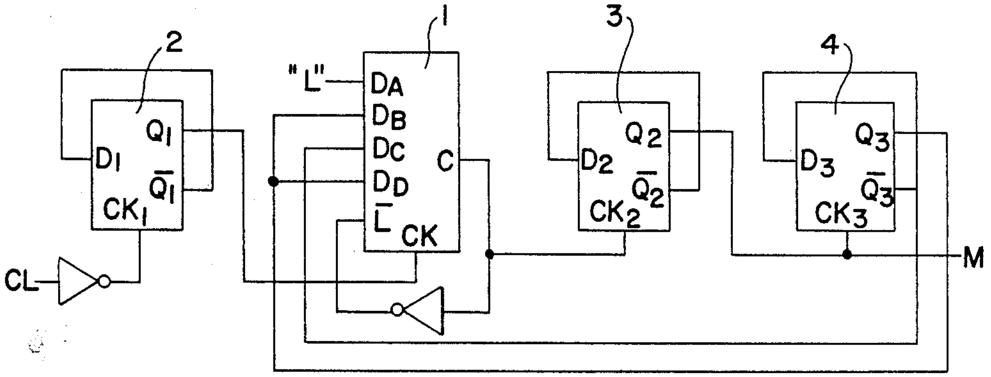
Figure 8:
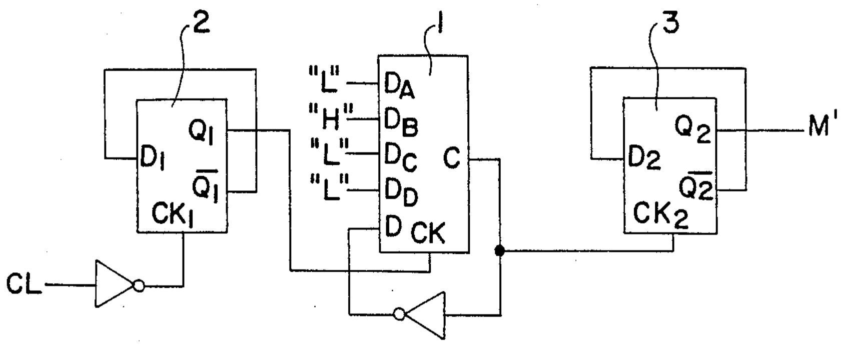

As is clear from the waveforms of signals Va' and Vb', by using the AC-converted signal M' which has a higher frequency and alternates every time it receives two clock pulses CL instead of using the AC-converted signal M that alternates in each frame, signals Va' and Vb' are provided with almost equivalent effective values. As a result, the OFF-contrasts of dots "a" and "b" are almost equivalent to each other. When using those waveforms shown in FIG. 7, since the frequency of AC-converted signal M' corresponds to the duty factor, an uneven display may result during a specific display pattern synchronous with the AC-converted signal M'. In other words, when receiving the On-signal synchronous with the alternation of the AC-converted signal M', the negative side of signal Vb' may switch to the positive in a certain display pattern. As a result, waveforms such as those of signal Vb in FIG. 11 are generated and an irregular display appears. To prevent this, the AC-converted signal M' can be caused to alternate for every three pulses CL. The period of synchronization is thus extended to slightly improve the display effect. However, in actuality an uneven display effect often still remains. FIG. 8 reflects the technical concept mentioned above and denotes a circuit that outputs an AC-converted signal M' inverting for every 28 clock pulses CL. It is obvious that an uneven display effect can be eliminated by applying an AC-converted signal M' which contains more than two kinds of frequencies, so no problem is present in the actual display operation. FIGS. 1 and 2 show the circuits generating the AC-converted signal M'. The circuit shown in FIG. 1 generates an AC-converted signal M' that alternates for every 12 clock pulses CL and then for every 16 pulses, as caused by counter 1. In some cases, it is better for the system to cause the AC-converted signal M' to alternate at a still longer interval, for example, when a duty of 1/100 is used to drive a liquid crystal. Taking this into account, the circuit shown in FIG. 2 causes the AC-converted signal M' to alternate for every 12 and 24 clock pulses CL. Note that, in addition to the hardware mentioned above, the AC-converted signal M' can also be generated by software as required. A specific period is needed depending on the availability of the liquid crystal material. When using an AC-converted signal M' that alternates itself for every 50 clock pulses CL to drive a liquid crystal with a duty of 1/100, for example, specific voltages identical in polarity are applied to each frame eventually causing the deterioration of the liquid crytal. In this case, by obtaining the AC-converted signal M' with an exclusive OR gate, which is comprised of an AC-converted signal M' that alternates in each frame and the AC-converted signal M' shown in FIGS. 8, 1, and 2, the above problem can be solved.

Figure 3:
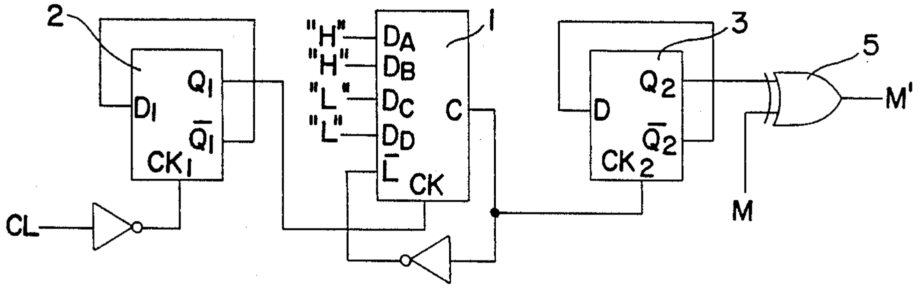
Figure 4:
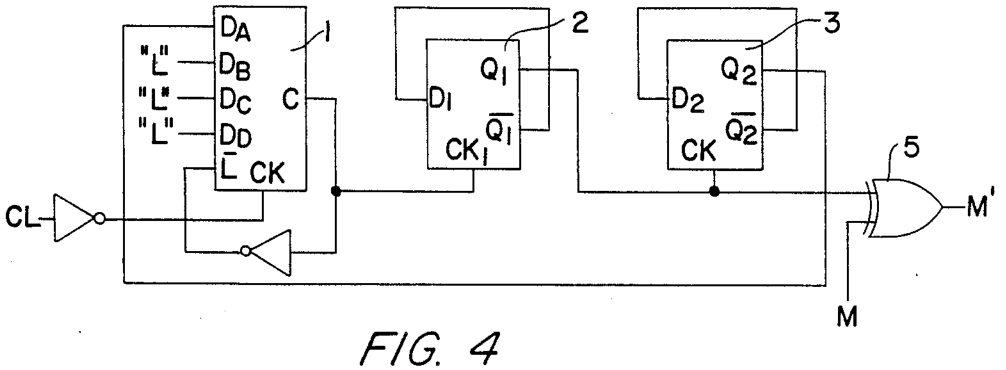
Figure 5:
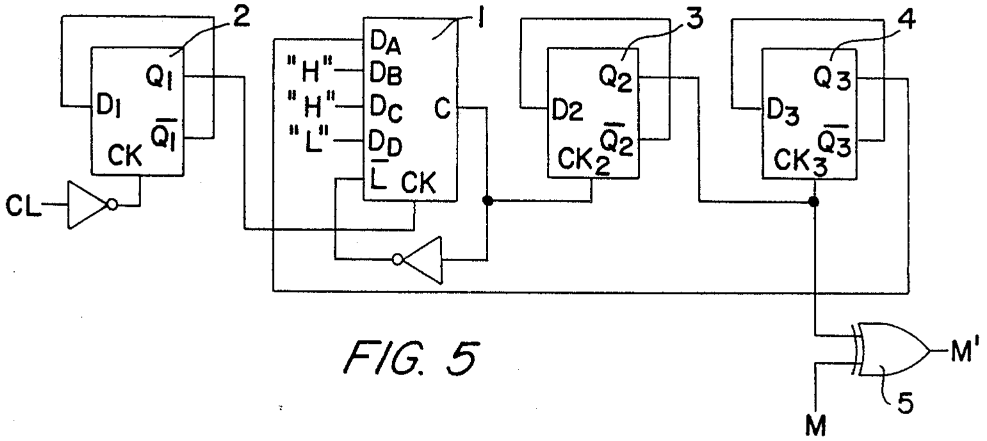
Figure 6:
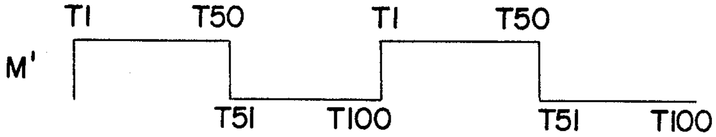
FIG. 6 is a chart denoting the waveforms of the AC-converted signal M′.
Figure 7A:
FIG. 7(A–H) is a chart denoting the waveforms of a liquid crystal driving signal reflecting the preferred embodiments of the present invention.
Figure 7B:
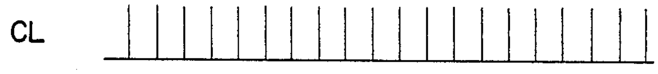
Figure 7C:
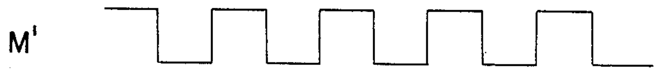
Figure 7D:
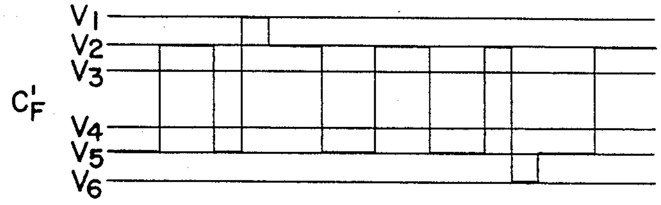
Figure 7E:
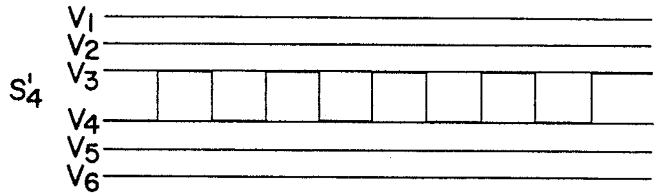
Figure 7F:
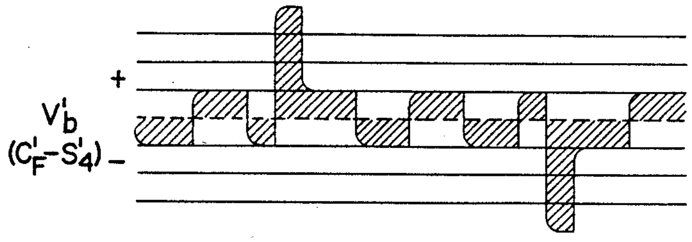
Figure 7G:
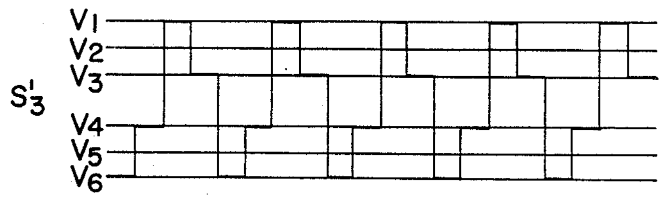
Figure 7H:
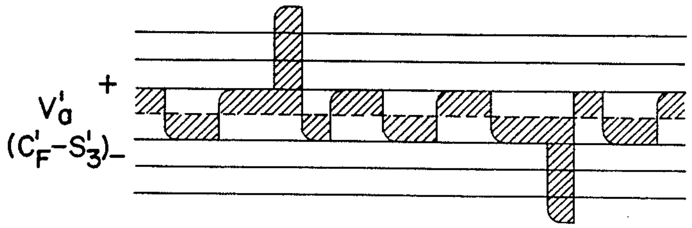
Figure 9:
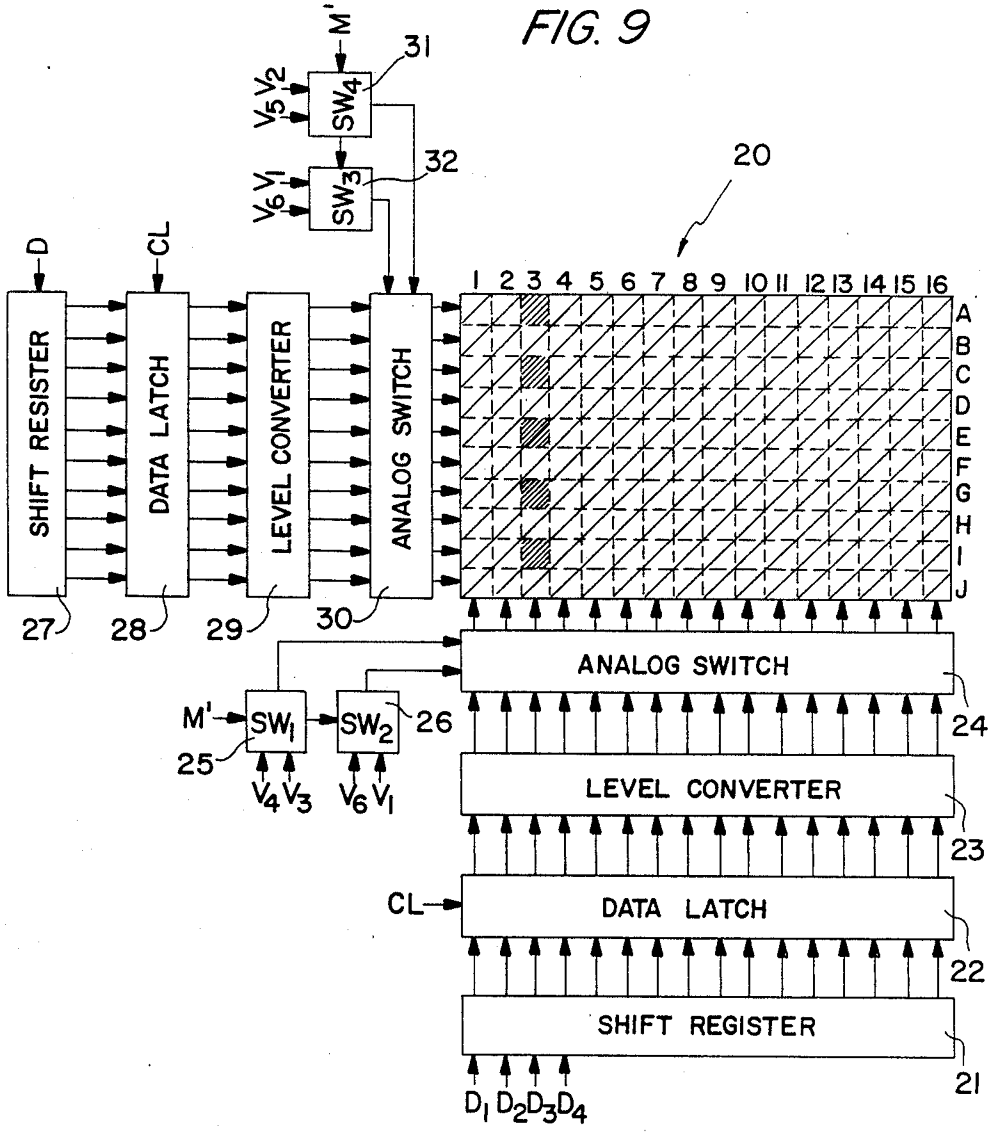
FIG. 9 is a block diagram representing the constitution of the liquid crystal display device reflecting the preferred embodiments of the present invention.
Figure 11A:
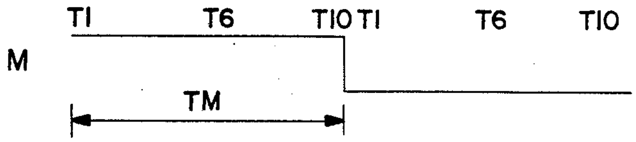
FIG. 11(A–F) is a chart denoting the waveforms of liquid crystal driving signals generated by a conventional liquid crystal display device.
Figure 11B:
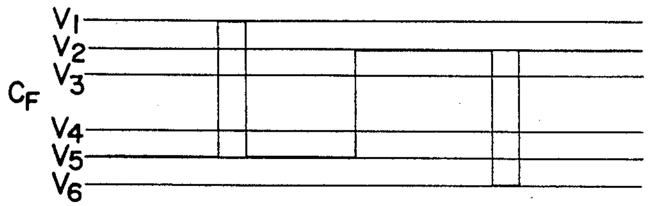
Figure 11C:
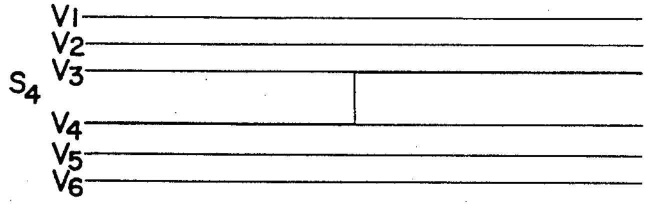
Figure 11D:
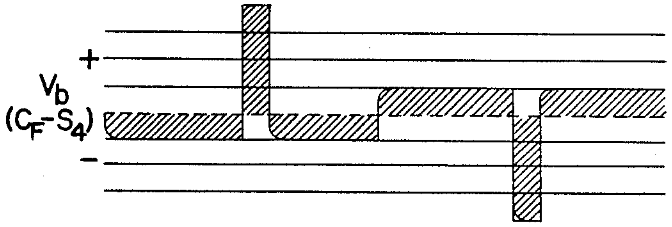
Figure 11E:
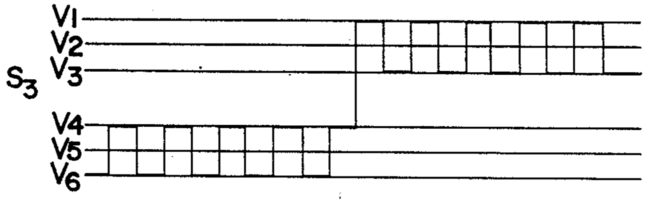
Figure 11F:
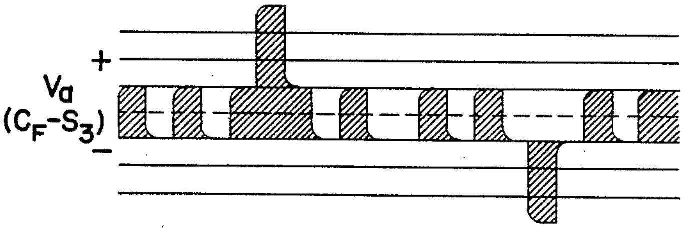

FIGS. 3, 4, and 5 denote circuits that generate said AC-converted signal M', in which a signal from either a D-type flip flop 3 or a D-type flip flop 4 and an AC-converted signal M are delivered to an exclusive OR gate 5, which then outputs the AC-converted signal M'. FIG. 9 shows the constitution of the 16×10 dot matrix liquid crystal display device including the liquid crystal driving system that relates to the present invention. Display data of the segment electrodes is delivered to an analogue switch 24 via a shift register 21, a data latch 22, and a level converter 23. In response to display data, the analogue switch 24 delivers bias voltages V4, V3, V6 and V1, selected from switches 25 and 26 in accordance with the AC-converted signal M', to the segment electrodes 1 through 16 of a liquid crystal matrix 20. The display data on the common-side electrodes is delivered to an analogue switch 30 via a shift register 27, a data latch 28, and a level converter 29. In response to display data, an analogue switch 30 delivers bias voltages V2, V5, V1, and V6, selected from switches 31 and 32 in accordance with the AC-converted signal M', to the common electrodes A through J of the liquid crystal matrix 20.

As is clear from the foregoing explanation, the preferred embodiment of the present invention provides the means for effectively driving liquid crystal display by applying a specific AC-converted signal having a specific frequency higher than the frame frequencies and different from the duty factor of the data signals, which allows the system to eliminate uneven display effects caused by differences in display patterns and the switching of frames, and thus eventually enhances the overall display quality. In addition, the liquid crystal driving system embodied by the present invention allows AC-converted signals to be distributed evenly to common electrodes without feeding voltages identical in polarity to specific common electrodes. Furthermore, it is possible for the present driving system to adequately set a specific frequency for AC-converted signals according to the material and capacity of the liquid crystal, the wiring resistance, and the drive capacity of the liquid crystal driving circuit.

While only certain embodiments of the present invention have been described, it will be apparent to those skilled in the art that various changes and modifications may be made therein without departing from the sprit and scope of the present invention as claimed.

What is claimed is:

1. A system for driving a liquid crystal display having a plurality of segment electrodes and a plurality of common electrodes, picture elements being defined at intersections between said segment electrodes and said common electrodes, comprising:

means for providing data signals of a specific duty factor;

means for driving said common electrodes with said data signals; and means for applying AC-converted signals to said picture elements at a frequency that is different from said specific duty factor and higher than a frame frequency at which said display is scanned, said means for applying AC-converted signals includes counter means which includes inputs set at predetermined logic high or low levels which selectively determine the frequency of the AC-converted signals and which variably alternates the AC-converted signals within each frame.

2. The system of claim 1 wherein said means for applying AC-converted signals further comprises:

means for supplying a system clock;

first D-type flip-flop means coupled to and clocked by said system clock and providing an output signal for clocking said counter means; and second D-type flip-flop means clocked by an output of said counter means and for supplying said AC-converted signals.

3. The system of claim 2 wherein said means for applying AC-converted signals further comprises exclusive-OR logic means coupled to the output of said second D-type flip-flop wherein the output of said exclusive-OR logic means supplies said Ac-converted signals.

4. The system of claim 2 wherein said means for applying AC-converted signals further comprises:

third D-type flip-flop means coupled to and clocked by an output of said second D-type flip-flop for providing output signals to said counter means inputs wherein the AC-converted signals obtained at the output of said second D-type flip-flop consist of a first portion of a first predetermined frequency followed by a second portion of a second predetermined frequency and wherein said predetermined frequencies alternate.

5. The system of claim 1 further including pulse means for alternating said AC signal and the AC signal alternates for every twelve pulses applied.

6. The system of claim 1 further including pulse means for alternating said AC signal and the AC signal alternates for every sixteen pulses applied.

7. The system of claim 1 further including pulse means for alternating said AC signal and the AC signal alternates for every twenty-four pulses applied.

8. The system of claim 3 further including pulse means for alternating said AC signal and the AC signal alternates for every fifty pulses applied.

9. The method of driving a liquid crystal display which includes a plurality of segment electrodes and a plurality of common electrodes, picture elements being defined between the intersections of the electrodes comprising the steps of:

(a) driving the common electrodes with data signals of a specific duty factor;

(b) applying AC converted signals to said picture elements with the use of counter means set at predetermined logic high or low levels which selectively determines the frequency of the Ac converted signals, the AC converted signals being applied at a frequency which is different from said specific duty factor and higher than a frame frequency at which said display is scanned;

(c) variably alternating the AC-converted signals within each frame.

10. The method of claim 9 wherein the AC signal alternates within a single frame by applying plural pulses through the counter.

11. The method of claim 10 wherein said plural pulses are selected from the group consisting of 12, 16, 24 and 50 pulses.

* * * * *